UNITED STATES PATENT OFFICE.

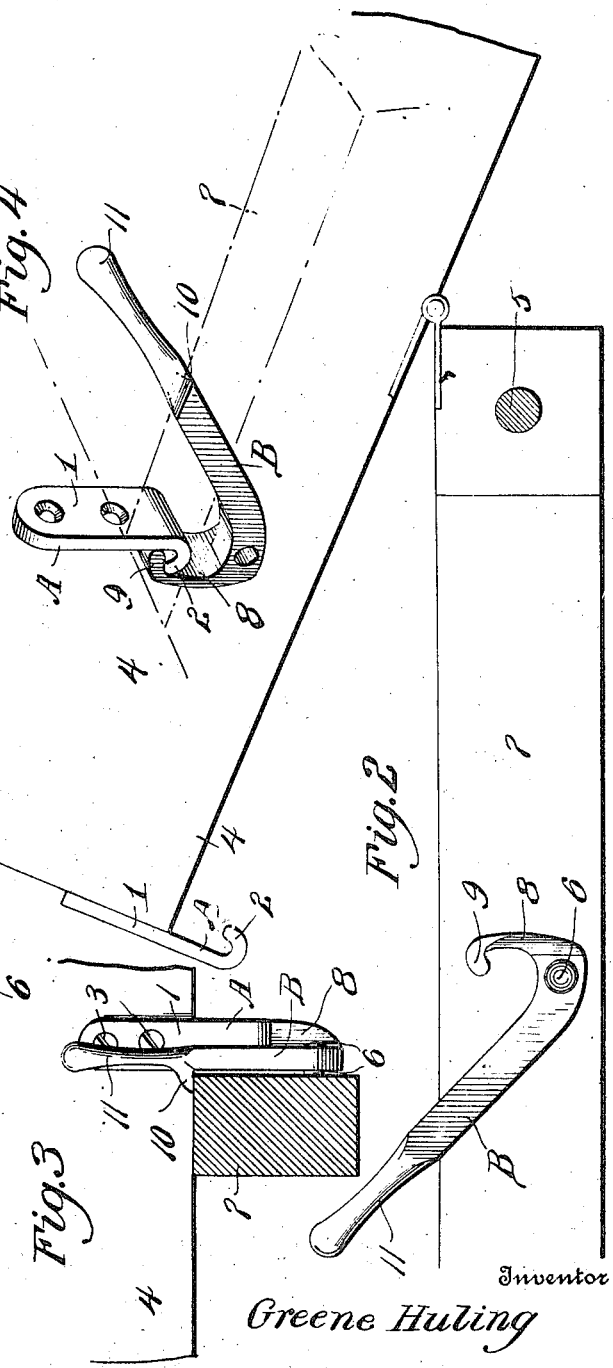

GREENE HULING, OF HAMPTON, CONNECTICUT.

LOCKING DEVICE FOR DUMP-CARTS.

1,024,338. Specification of Letters Patent. Patented Apr. 23, 1912.

Application filed October 24, 1911. Serial No. 656,383.

*To all whom it may concern:*

Be it known that I, GREENE HULING, a citizen of the United States, residing at Hampton, in the county of Windham and State of Connecticut, have invented new and useful Improvements in Locking Devices for Dump-Carts, of which the following is a specification.

This invention relates to locking devices for dump carts, the object of the same being to provide simple and efficient means whereby the cart body will be held securely in position for operation and in such a manner as to permit the ready release of the same for the purpose of dumping.

A further object of the invention is to provide a locking device which may be readily applied to and used in connection with dump carts of various constructions whether adapted to be drawn by one or two horses.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawings,—Figure 1 is a side elevation showing the invention applied in position for operation and showing as much of a dump cart as is necessary to enable the invention to be understood, the axle and a portion of the cart body being shown in section. Fig. 2 is a similar view showing the cart body in the act of dumping. Fig. 3 is an end view of the device as seen in Fig. 1. Fig. 4 is a perspective view of the parts constituting the invention, as seen from the opposite side to that exhibited in Figs. 1 and 2.

Corresponding parts in the several figures are denoted by like characters of reference.

The improved locking device includes two principal members, namely, a hook member A and a lever member B. The hook A comprises a plate 1, the lower extremity of which is bent to form a shallow hook-shaped projection 2. Said base plate is apertured for the passage of fastening members, such as screws, whereby it may be secured upon the front end of one of the sills 4 of the dump cart, the body of which is hingedly connected with the axle 5 in the usual manner to permit the dumping of the contents of the body. The lever member B, which is fulcrumed by means of a bolt 6 upon one of the cart ways 7 that extend forwardly from the axle, is provided with an upwardly extending heel 8 having a terminal hook 9 adapted to engage the hook 2, as clearly seen in Fig. 1 of the drawings. The lever B is provided on one of its side faces adjacent to the way on which it is pivoted with a laterally extending flange 10 adapted to rest upon the upper face of said way or beam, when the hooks 9 and 2 are in engagement with each other, the object of the flange 10 being to limit the movement of the handle portion 11 of the lever in a downward direction; not only when the hook portions 9 and 2 are in engagement with each other, but more particularly when the hook 2 is disengaged from the hook 9 as is the case when the cart body is tilted to discharge the contents thereof. When this is done the handle portion of the lever will drop by gravity, but it will be intercepted by the flange 10 engaging the upper face of the beam or way 7, thereby maintaining the hook member 9 in position to be again engaged by the hook member 2. The upper face of the hook member 9 and the lower face of the hook member 2 are beveled, as shown, and it follows that when, after discharging the contents of the cart body, the latter is restored to its initial position, the hook member 2 will engage the upper face of the hook member 9, thereby tilting the lever handle in an upward direction until the hook members 2 and 9 pass into engagement with each other, the said hook members being retained in interlocking engagement by the weight of the handle portion of the lever.

As will be seen from the foregoing description, taken in connection with the drawing hereto annexed, the improved cart lock is extremely simple in construction, and it may be very easily operated for the purpose of enabling the cart body to be tilted to discharge the contents thereof. As soon as the cart body is restored to its initial position, the hook members automatically engage each other, thus locking the cart body in position for operation.

Having thus described the invention, what is claimed as new, is:—

In a dump cart, an axle having a forwardly extending beam, a cart body including a sill hingedly connected with the axle, and a locking device comprising a plate secured upon the front end of the sill and having at its lower extremity a rearwardly extending hook member, and a lever pivoted upon the beam and having an upwardly extending heel portion terminally hooked to engage the hook member of the plate, said lever having also a forwardly extending handle portion provided with a laterally projecting flange engaging the upper face of the beam upon which the lever is fulcrumed; the opposed faces of the hook members upon the lower end of the plate and on the heel end of the lever being beveled to automatically engage one another.

In testimony whereof I affix my signature in presence of two witnesses.

GREENE HULING.

Witnesses:
FRANK P. PALMER,
MARY G. BURNHAM.